(12) United States Patent
Kushnir et al.

(10) Patent No.: US 12,634,111 B2
(45) Date of Patent: May 19, 2026

(54) VERIFYING REMOTE EXECUTION OF MACHINE LEARNING INFERENCE UNDER HOMOMORPHIC ENCRYPTION USING PERMUTATIONS

(71) Applicant: International Business Machines Corporation, Armonk, NY (US)

(72) Inventors: Eyal Kushnir, Kfar Vradim (IL); Ramy Masalha, Kafr Qari (IL); Omri Soceanu, Haifa (IL); Nir Drucker, Zichron Yaakov (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/097,995

(22) Filed: Jan. 17, 2023

(65) Prior Publication Data

US 2024/0243898 A1     Jul. 18, 2024

(51) Int. Cl.
H04L 9/00 (2022.01)
G06N 5/04 (2023.01)
G06N 20/00 (2019.01)

(52) U.S. Cl.
CPC .............. H04L 9/008 (2013.01); G06N 5/04 (2013.01); G06N 20/00 (2019.01)

(58) Field of Classification Search
CPC ........... H04L 9/008; G06N 5/04; G06N 20/00
See application file for complete search history.

(56) References Cited

U.S. PATENT DOCUMENTS

2019/0370440 A1 *  12/2019  Gu ........................... G06N 3/08
2022/0114249 A1     4/2022   Grancharov et al.

OTHER PUBLICATIONS

Xu, Guowen, et al. "Secure and verifiable inference in deep neural networks." Proceedings of the 36th Annual Computer Security Applications Conference. 2020. (Year: 2020).*
Li, Fangqi, Shilin Wang, and Yun Zhu. "Solving the capsulation attack against backdoor-based deep neural network watermarks by reversing triggers." arXiv preprint arXiv:2208.14127 (2022). (Year: 2022).*

(Continued)

*Primary Examiner* — Sangseok Park
(74) *Attorney, Agent, or Firm* — Michael O'Keefe

(57) ABSTRACT
A technique to remotely identify potential compromise of a service provider that performs homomorphic inferencing on a model. For a set of real data samples on which the inferencing is to take place, at least first and second permutations of a set of trigger samples are generated. Every set of samples (both trigger and real samples) are then sent for homomorphic inferencing on the model at least twice, and in a secret permutated way. To improve performance, a permutation is packaged with the real data samples prior to encryption using a general purpose data structure, a tile tensor, that allows users to store multi-dimensional arrays (Continued)

TRUE SAMPLES TO INFER ON
901

MODEL OWNER
902

900

905
TRIGGER SET SAMPLES, RANDOMLY PLACED AND PERMUTED (tensors) of arbitrary shapes and sizes. In response to receiving one or more results from the HE-based model inferencing, a determination is made whether the service provider is compromised. Upon a determination that the service provider is compromised, a given mitigation action is taken.

18 Claims, 7 Drawing Sheets

(56) References Cited

OTHER PUBLICATIONS

Cao et al., "IPGuard: Protecting Intellectual Property of Deep Neural Networks via Fingerprinting the Classification Boundary", ASIA CCS '21: Proceedings of the 2021 ACM Asia Conference on Computer and Communications Security, Jun. 4, 2021, pp. 14-25.

Weng et al., "pvCNN: Privacy-Preserving and Verifiable Convolutional Neural Network Testing", arXiv:2201.09186v3 [cs.CR] May 28, 2023, 16 pages.

Xu et al., "Secure and Verifiable Inference in Deep Neural Networks", ACSAC '20: Proceedings of the 36th Annual Computer Security Applications Conference, Dec. 8, 2020, pp. 784-797.

Zhang et al., "Protecting Intellectual Property of Deep Neural Networks with Watermarking", ASIACCS '18: Proceedings of the 2018 on Asia Conference on Computer and Communications Security, May 29, 2018, pp. 159-172.

Chen et al., "SecureNets: Secure Inference of Deep Neural Networks on an Untrusted Cloud," Proceedings of the 10th Asian Conference on Machine Learning, PMLR 2018.

Ghodsi, et al., "SafetyNets: Verifiable Execution of Deep Neural Networks on an Untrusted Cloud," ResearchGate, Jun. 2017.

He, et al., "VerIDeep: Verifying Integrity of Deep Neural Networks through Sensitive-Sample Fingerprinting," arXiv:1808.03277v2 [cs_CR] Aug. 20, 2018.

Yadollahi, et al., "Robust Black-box Watermarking for Deep Neural Network using Inverse Document Frequency," arXiv:2103.05590v1 [cs.CR] Mar. 9, 2021.

Natarajan, et al., "CHEM-MIX: Combining Homomorphic Encryption with Trusted Execution Environments for Two-Party Oblivious Inference in the Cloud," Cryptology ePrint Archive, 2021.

Aharoni, et al., "HE-PEx: Efficient Machine Learning Under Homomorphic Encryption Using Pruning, Permutation and Expansion," arXiv:2207.03384v1 [cs_CR] Jul. 7, 2022.

Aharoni, et al., "HeLayers: A Tile Tensors Framework for Large Neural Networks on Encrypted Data," arXiv:2011.01805v3 [cs.CR] Jan. 1, 2023.

* cited by examiner

100

VERIFYING REMOTE EXECUTION OF MACHINE LEARNING INFERENCE UNDER HOMOMORPHIC ENCRYPTION USING PERMUTATIONS

BACKGROUND OF THE INVENTION

Technical Field

This disclosure relates generally to the use of homomorphic encryption operations to facilitate inferencing against encrypted data.

Background of the Related Art

Machine learning (ML) models have had success in recent years handling a wide variety of prediction tasks in areas such as health and finance. The training process of these models can require a vast amount of training data, computational resources, and expert knowledge. Therefore, model owners want to keep their models private. Data owners, like hospitals or financial institutes, would also like to keep their data private. Because running ML inference may require a large amount of computational work, the data owner and the model owner can use the service of a cloud provider. To hide the private model and the private dataset from the cloud provider, the parties can use solutions based on Homomorphic Encryption (HE) solution. Homomorphic encryption is a form of encryption that permits users to perform computations on encrypted data without first decrypting that data. The computations are left in an encrypted form which, when decrypted, result in an identical output to that produced had the operations been performed on the unencrypted data. Homomorphic encryption includes multiple types of encryption schemes that can perform different classes of computations over encrypted data. One of these types is Fully Homomorphic Encryption (FHE).

While the above-described approaches provide advantages, there remains the problem of how the data owner and/or the model owner can verify that the inference results they get from the cloud provider are genuine, using the original dataset and original model. Techniques to address this problem have been proposed. In one approach, known as SecureDL, the model owner generates a "trigger set" of samples and their corresponding labels, as predicted by the model. The samples of the trigger set are selected in a way that ensures that the labels that the model predicts for them can be considered as a unique "fingerprint" of the model. For example, if the original task is to classify pictures of dogs and cats, the trigger set could contain pictures of random noise. In this approach, the trigger set or a random subset of the trigger set is combined with the submitted data of the data owner in some random permutation so that the server will not be able to identify which samples belong to the trigger set. After receiving the inference results, the data owner and/or the model owner are able to validate that the labels predicted for the trigger set samples match the expected ones. Because the samples are encrypted, the cloud provider in theory is unable to distinguish between samples of the trigger set to sample the data owner's dataset. While useful, this approach does not provide a general solution for all three participants (model owner, data owner and provider), and it requires significant communication overhead.

Another approach described in the literature is neural network identification using "black-box" access, notably in the context of intellectual property theft prevention. In this setting, the model owner trains the model with special samples that are distant enough from the instances of the training set of the original task, but also not too distant to avoid being identified. The model owner then uses these secret "back-door" samples to query a suspected Machine Learning-as-a-Service (MLaaS) provider. This approach, however, has the disadvantage that it depends on samples that are hard to identify (because the samples are encrypted). Still another known approach uses special samples that are identified after the end of the training process as "fingerprints" for the model, but this latter approach has the disadvantage in that it requires picking of valid samples (relevant to the classification task) that are necessarily close to the classification boundary (to make sure that these samples cannot be identified).

BRIEF SUMMARY

A method, apparatus and computer program product for remotely identifying potential compromise of a service provider that performs privacy-preserving homomorphic inferencing on a model. According to this approach, and for a set of real data samples on which the inferencing is to take place, at least first and second permutations of a set of trigger samples are generated. Every set of samples (both trigger and real samples) are then sent for homomorphic inferencing on the model, and in a secret permutated way. Further. and to improve performance, a permutation is packaged with the real data samples prior to encryption using a general purpose data structure, called a tile tensor, that allows users to store multi-dimensional arrays (tensors) of arbitrary shapes and sizes. Tile tensors enable efficient coding of the trigger and real samples in an HE-friendly manner. In response to receiving one or more results from the HE-based model inferencing, a determination is made whether the service provider is compromised. This determination is based on whether the receiving entity can validate that at least one label predicated by the model for a trigger sample in the set of trigger samples matches a label returned in a result. Upon a determination that the service provider is compromised, a given mitigation action is taken. By permutating the trigger samples in this manner, the approach significantly increases the probability of catching a cheating service provider, and the solution is efficient in terms of latency and bandwidth costs.

The foregoing has outlined some of the more pertinent features of the disclosed subject matter. These features should be construed to be merely illustrative. Many other beneficial results can be attained by applying the disclosed subject matter in a different manner or by modifying the subject matter, as will be described below.

BRIEF DESCRIPTION OF THE DRAWINGS

For a more complete understanding of the subject matter herein and the advantages thereof, reference is now made to the following descriptions taken in conjunction with the accompanying drawings, in which.

DETAILED DESCRIPTION OF AN ILLUSTRATIVE EMBODIMENT

Figure 1:
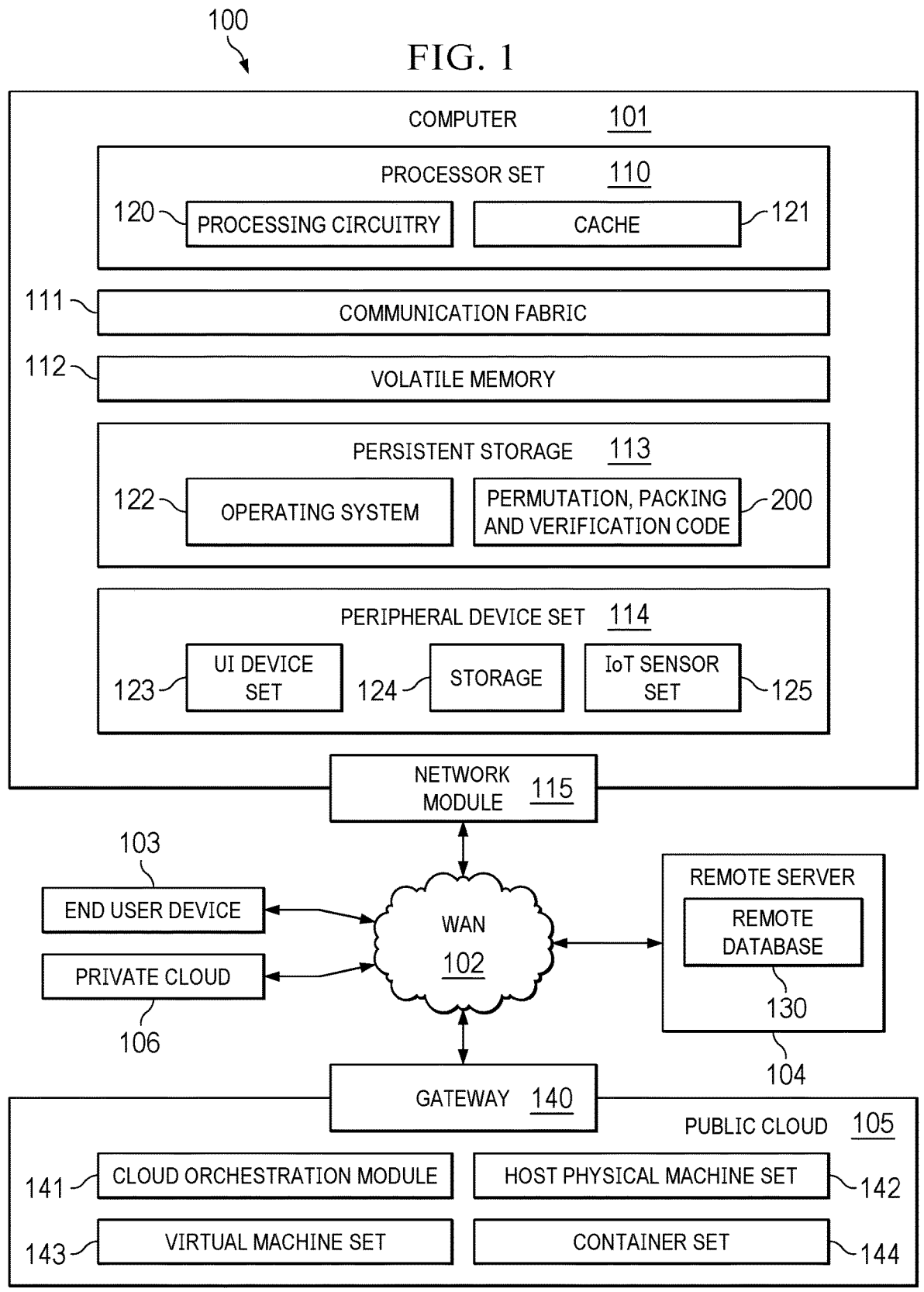
FIG. 1 depicts an exemplary block diagram of a data processing system in which exemplary aspects of the illustrative embodiments may be implemented.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as permutation, packing and verification code 200 of this disclosure that facilitates remote verification of HE-based inferencing by a service provider. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IOT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor Set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication Fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile Memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent Storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as Linux, various known proprietary operating systems or open source Portable Operating System Interface-type operating systems that employ a kernel. The code included in block 200 typically includes at least some of the computer code involved in performing the inventive methods.

Peripheral Device Set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network Module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote Server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public Cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private Cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Homomorphic Encryption

By way of further background, Homomorphic Encryption (HE) is a form of encryption that allows computations to be carried out on ciphertext, thus generating an encrypted result which, when decrypted, matches the result of operations performed on the plaintext. A homomorphic encryption scheme is a cryptosystem that allows computations to be performed on data without decrypting it. Formally, a cryptosystem is homomorphic with respect to operation $\diamond$, if there exists an operation such that $x_1 \diamond x_2 = D(E(x_1, pk)H(E(x_2, pk), sk)$, where E and D represent the encryption and decryption mechanisms, respectively, pk and sk represent the public and private/secret keys, respectively, $x_1$ and $x_2$ are two plaintext operands, and H is a Hadamard product operation. A homomorphic encryption scheme is considered to be fully homomorphic (FHE) if it allows arbitrary computations on the ciphertext. Specifically, given $c_i = E(x_i, pk)$, $i = 1, 2, \ldots, K$, an FHE scheme allows the computation of $c = g(c_1, c_2, \ldots, c_K)$ such that $D(c, sk) = f(x_1, x_2, \ldots, x_K)$ for any arbitrary function $f$. FHE is often achieved by employing a somewhat homomorphic (SWHE) or leveled HE scheme in combination with a bootstrapping or recryption technique. The SWHE scheme is capable of supporting computations only up to a preset level of complexity determined by its parameters. This is because the ciphertexts are "noisy," and the noise keeps growing with each HE computation, and once the noise grows beyond some parameter-dependent threshold the ciphertext can no longer be decrypted. This problem may be addressed by bootstrapping, which refreshes the ciphertext and for certain schemes (e.g., Brakerski-Gentry-Vaikuntanathan (BGV)) reduces its noise level, but at the cost of relying on circular security. Bootstrapping, however, is a computationally-expensive and time-consuming operation. Therefore, for practical feasibility, the number of bootstrapping operations should be kept at a minimum and possibly avoided.

Homomorphic encryption enables the construction of programs for any desirable functionality, which can be run on encrypted inputs to produce an encryption of the result. Because such a program need never decrypt its inputs, it can be run by an untrusted party without revealing its inputs and internal state. Toolkits for implementing homomorphic encryption are known. A well-known toolkit is HElib, an open-source project. The current version of HElib supports addition and multiplication operations of arbitrary numbers in binary representation, using encryption of the individual bits.

By way of further background, several FHE schemes have been proposed based on hardness of a computational problem known as Ring Learning with Errors (RLWE). Prominent examples of such schemes include BFV (Brakerski/Fan-Vercauteren), BGV (Brakerski-Gentry-Vaikuntanathan), and CKKS (Cheon-Kim-Kim-Song) schemes, which schemes (named after the original proposers) are both additively and multiplicatively homomorphic. While the BFV and BGV schemes are efficient for vector operations over integers, the CKKS scheme is more appropriate for "approximate" (limited precision) floating-point operations. Furthermore, these schemes support Single Instruction Multiple Data (SIMD) operations, in particular, by packing different plaintext values into different slots in the ciphertext. This ciphertext packing enables parallelization of addition and multiplication operations.

Machine Learning-as-a-Service Using Homomorphic Encryption

Figures 2, 3:
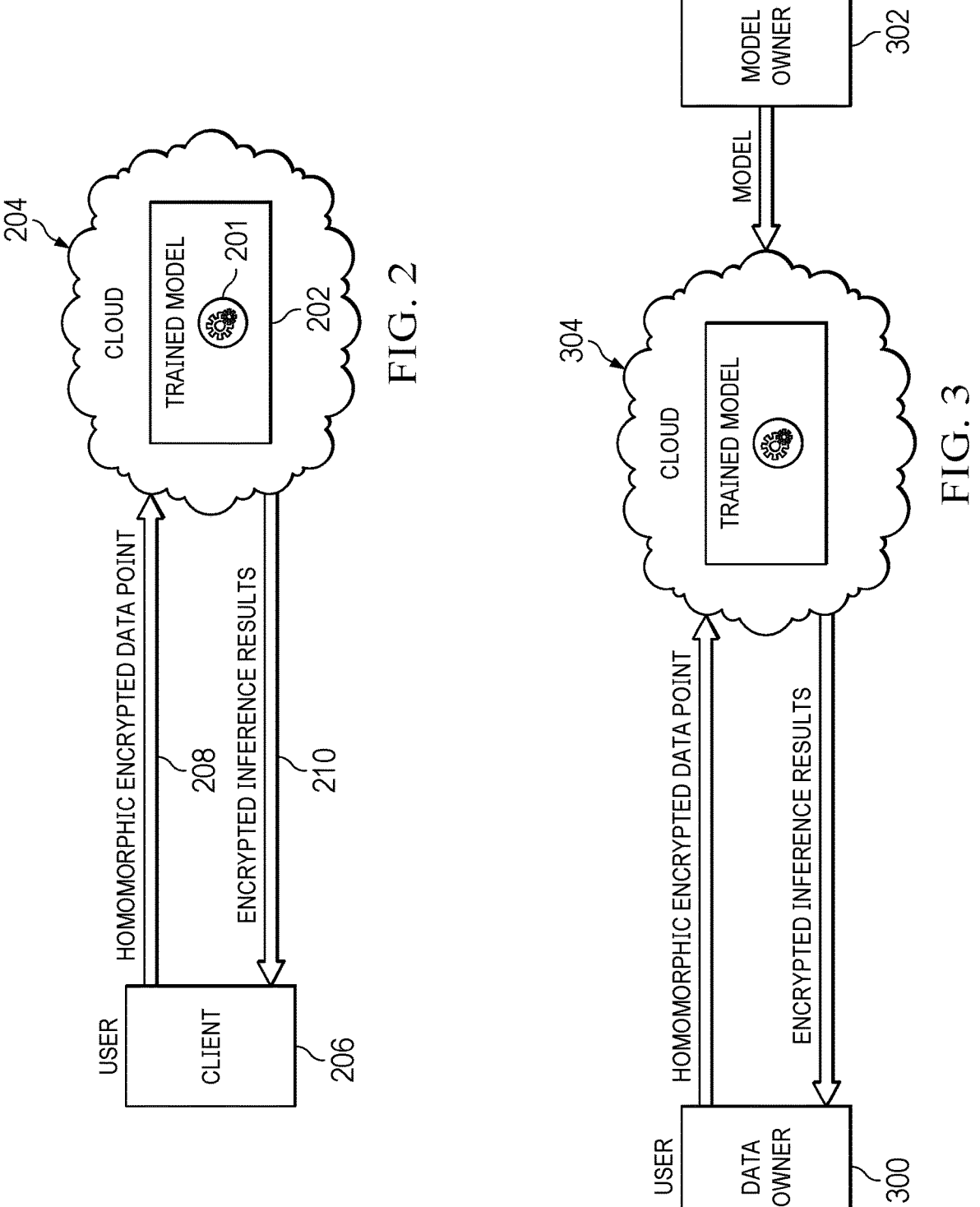
FIG. 2 is a representative Machine Learning as-a-service (MLaaS) operating environment in which the techniques of this disclosure may be implemented.
FIG. 3 depicts a first scenario wherein a data owner and a model owner are separate entities.

With reference now to FIG. 2, a representative (but non-limiting) operating environment for the technique herein is depicted. As shown, in a typical machine learning (ML) as a service scenario, a trained model such as a decision tree 201 is hosted on a cloud server 202 (sometimes referred to herein as Cloud) in a cloud computing infrastructure 204 such as described above. The model/tree (or other decision logic) 201 may be exposed as an Application Programming Interface (API) on the cloud 204. In operation, and as a service, the hosting cloud server 202 allows users to run inference queries on the model/tree 201. Typically, a user (sometimes referred to herein as Client) is associated with a client machine 206, and the client and server are configured to operate according to a client-server model. A homomorphic encryption (HE) protocol is enforced across the client-server operating environment such that the Cloud protects the model's privacy while users (Clients) maintain the privacy of their scoring data points returned by the model/tree. In a typical request-response workflow, the client 206 sends an encrypted query 208 (e.g., a data point) to the cloud server 202, the cloud server 202 applies the model/tree 201 and then returns a response 210. The response includes the encrypted inference results. In this manner, privacy-preserving inference problems are securely evaluated.

Thus, as depicted in FIG. 2, the Client homomorphically-encrypts its data points and shares them with the Cloud. In this example, the Cloud then uses the public key received from the Client to encrypt its model, and it homomorphic-ally-evaluates the decision tree on the encrypted data points. The Cloud does not need to encrypt its model before using on inference on the encrypted data point supplied by the user. This is because FHE (and other schemes) allow computations to be performed that involve both ciphertexts (like the user's data point) and plaintexts (e.g., the Cloud's model).

Verifying Remote Execution of Machine Learning Inference Under HE Using Permutations With the above as background, the technique of this disclosure is now described.

In the MLaaS context, typically there are three (3) entities, namely, a "data owner," a "model owner" (an entity that generates, manages or otherwise controls the trained model), and a "service provider" (sometimes referred to as the "cloud provider") that operates the hosting cloud server.

Figures 4, 5:
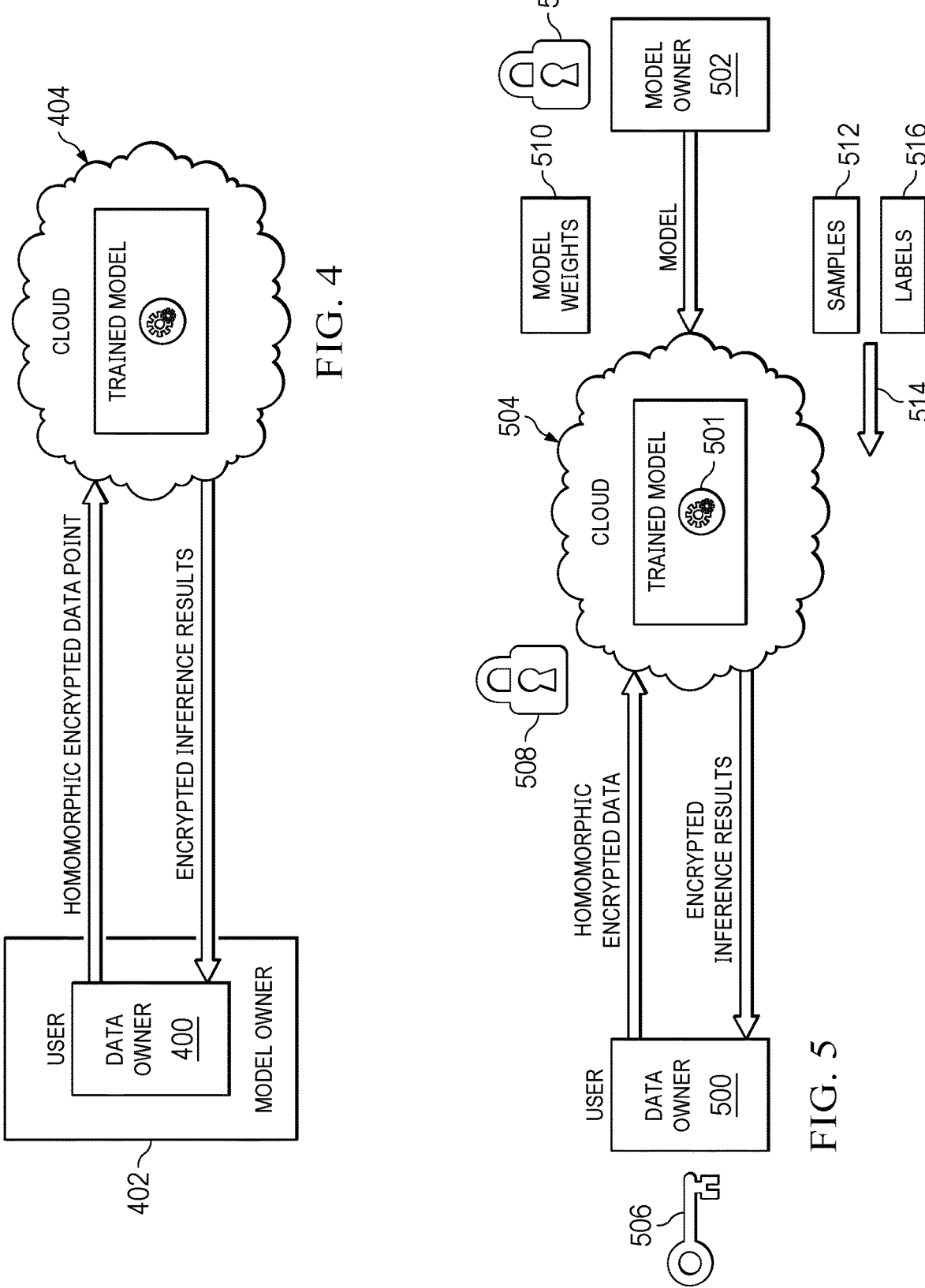
FIG. 4 depicts a second scenario wherein the data owner and the model owner are the same entity.
FIG. 5 depicts a first operating embodiment of this disclosure wherein inference results generated by the service provider are exposed only to the data owner.

There are several different scenarios that correspond to distinct security models and setups. In a first scenario, as depicted in FIG. 3, the data owner 300 and the model owner 302 are separate entities. Each such owner has an associated computing system such as described above in FIG. 1, and one or both of these systems include the permutation and verification codebase. In this scenario, the entities 300 and 302 desire to hide their private data/model from each other. In a second scenario, as depicted in FIG. 4, the data 400 and the model owner 402 are the same entity. In both cases, the entities (300, 302, or 400, 402) desire to hide their private data/model from the service provider 304 or 404 (as the case may be), and eavesdroppers. As will be seen, the solution herein provides security against a covert service provider (304 or 304) and proof of work for its MLaaS activity. In this threat model, it is assumed that the service provider is willing to actively cheat (and as such is not semi-honest), but only if it is not caught. For example, the service provider might use a much smaller and simple model (as compared to the model provided by the model owner) and that would produce "good enough" results to remain undetected without special verification, as in the solution described below. Another example is that the service provider might perform inference only on a subset of the submitted data of the data owner and then duplicate the results for the rest of the data. In still another use case, the service provider also might corrupt a single prediction value. All of these scenarios are detected by the receiver of the inference results using the following solution.

In particular, and in a first embodiment as now depicted in FIG. 5, the inference results are exposed only to the data owner 500. From a security model standpoint, it is assumed that the service provider 504 and the data owner 500 do not collude against the model owner 502. In this scenario, a private key 506 is generated by the data owner 500, which then sends the associated public key 508 (of the private-public key pair) to the model owner 502 and to the service provider 504. The model owner 502 then encrypts its model weights 510 using the public key 508 and sends them to the service provider 504. Also, the model owner 502 generates a trigger set 512 of fabricated samples and sends them to the data owner 500 in a secure channel 514 along with their labels 516, as predicted by the model 501. The data owner 500 combines the trigger set 512 inside with its submitted data, encrypts the result (using HE, as previously described), and sends it to the service provider 504. Subsequently, the service provider 504 performs the inference on the encrypted data with the encrypted model weights using fully homomorphic encryption properties, and it then sends the result back to the data owner 500. Except for the inclusion of the trigger samples, this is usual MLaaS operation. The data owner 500 then decrypts the result and validates that the labels predicted to the trigger set samples match the expected ones. If they do, the data owner is assured that the result obtained from the service provider is genuine (i.e., it has been obtained using the original dataset and the original model 501), thus providing a proof of work of the service provider.

Figure 6:
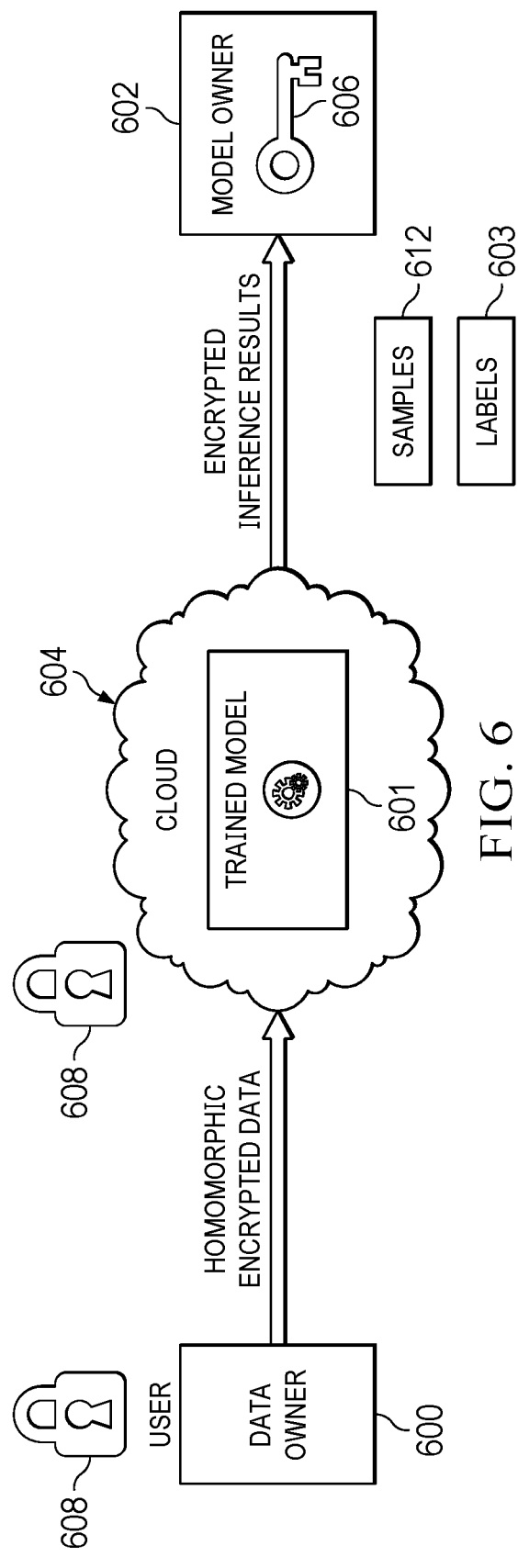
FIG. 6 depicts a second operating embodiment of this disclosure wherein inference results generated by the service provider are exposed only to the model owner.

In a second embodiment, and as depicted in FIG. 6, the inference results provided by the service provider 604 are exposed only to the model owner 602. From a security model standpoint, it is assumed that the service provider 604 and the model owner 602 do not collude against the data owner 600. Here, the private key 606 is generated by the model owner 602, which then sends the associated public key 608 to the data owner 600 and the service provider 604. The rest of the protocol is similar to the previous setup as described in FIG. 5. In particular, the service provider (having performed the inferencing against the model 601 sends the inference result back to the model owner 602. The data owner 600 informs the model owner 602 of the indices at which the data owner 600 placed the samples of the trigger set 612 so that the model owner 602 can verify that their predicted labels 603 match the expected ones. If they do, the model owner 602 is assured that the result obtained from the service provider is genuine (i.e., it has been obtained using the original dataset and the original model 601), thus once again providing a proof of work of the service provider. In this setup, preferably the model owner 602 also encrypts the trigger set 612 before sending it to the data owner 600 to hide the samples of the trigger set from the data owner 600. This allows the model owner 602 to reuse the same trigger set in many instances of the protocol.

Figure 7:
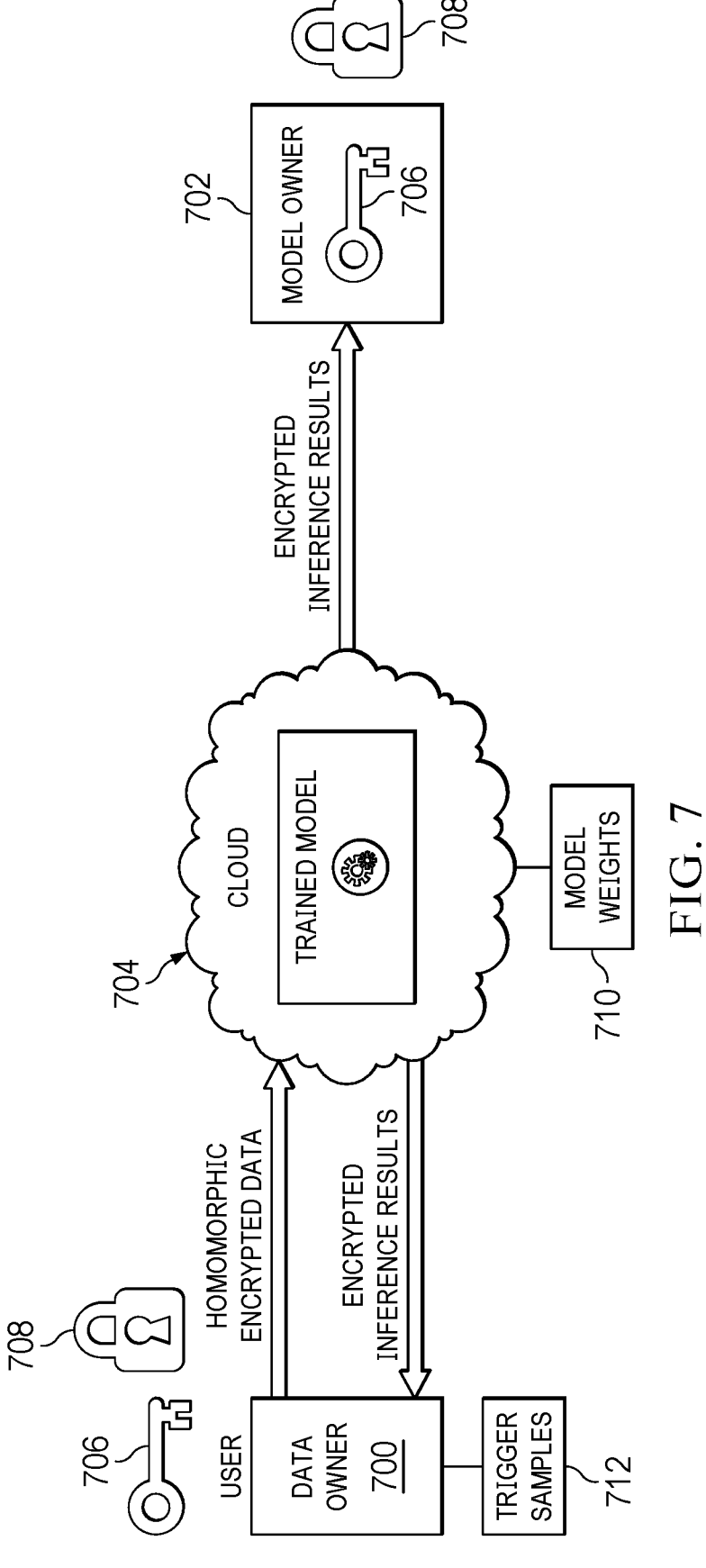
FIG. 7 depicts a third operating embodiment of this disclosure wherein inference results generated by the service provider are exposed to both the data owner and the model owner, and these entities collaborate with one another.

In a third embodiment, and as depicted in FIG. 7, the non-collusion assumptions (as in the embodiments in FIGS. 5 and 6) are removed from the perspective of the security model. In this embodiment, the inference results are exposed to both the data owner 700 and the model owner 702, preferably in a secret sharing setup wherein the owners need to cooperate to decrypt the results returned. To this end, preferably a multi-key Fully Homomorphic Encryption (FHE) or other similar solution is utilized. In a multi-key FHE scheme for n parties, each party individually chooses a key pair and uses it to encrypt its own private input. Given n ciphertexts computed in this manner, the parties then homomorphically evaluate a circuit over these ciphertexts to obtain a new ciphertext containing the circuit output, which can then be decrypted via a decryption protocol. Thus, and to this end, a distinct private key 706 is generated by each the data owner 700 and the model owner 702, and the corresponding public keys 708 (that also differ from one another) are sent to the other parties. The model owner 702 encrypts its model weights 710 under its private key and sends them to the service provider 704. Also, the model owner 702 generates a fresh trigger set (or uses an existing one) 712, encrypts it, and sends it to the data owner 700. The rest of the protocol is similar to the previous setups. In particular, after the data owner 700 and model owner 704 cooperate to decrypt the results together, the model owner 704 verifies the predicted labels of the trigger set as in the second embodiment (FIG. 6).

Figure 8:
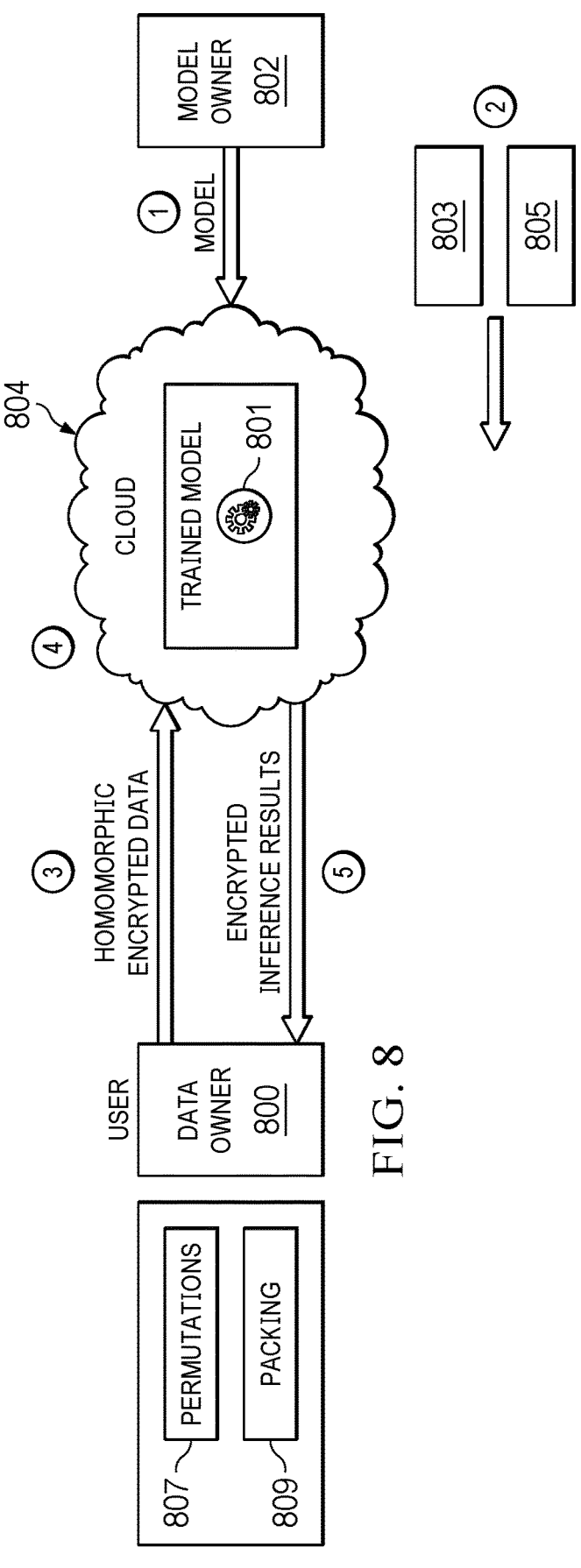
FIG. 8 depicts the MLaaS operation with several optimizations that are implemented according to this disclosure to facilitate remote verification of the service provider.

Generalizing, and as depicted in FIG. 8, at step (1) the model owner 802 encrypts and uploads a model 801 to the service provider 804, typically a cloud-based MLaaS service as depicted in FIG. 2. At step (2), the model owner 802 then provides a list of trigger sets 803 and their values 805 to the data owner 800 (the user). At step (3), the data owner combines (batches) the trigger samples together with its own samples into one encryption and uploads it to the cloud service. According to this disclosure, and as will be described in detail below, step (3) includes several optimizations, namely, a permutation operation 807, and a packaging operation 809, which optimizations significantly increase the likelihood that one or both participating entities (data owner and/or model owner) can determine whether the MLaaS provider is cheating. At step (4), the service provider performs the ML-based inferencing. At step (5), and upon receiving the results of the inferencing, and in this embodiment (like FIG. 7), the data owner 800 (here the verifier) checks whether the results of the trigger set are valid; if one of them is not, then the user aborts and reports the service provider. As noted, in other embodiments (FIG. 6 and FIG. 7), the verifier may be the model owner, or the data and model owners acting collaboratively.

To generate the trigger set, the model owner implements one of several different strategies, as is now described. In one approach, the trigger set samples are fabricated samples that contain random noise. In such case, the model owner should verify that the predicted labels of the random samples are also distributed randomly over a label domain. This approach is advantageous, as such noisy samples are efficient to generate, thereby reducing the model owner's workload significantly, and also they are easy to identify when compared to valid samples, thereby making it the verification process (whether by the model owner, the data owner, or both) also highly efficient. Because the solution hides the samples from the service provider using encryption, the service provider cannot distinguish between the trigger set samples and the valid samples. As a variant, the trigger set is generated by the model owner using a Pseudo-Random Generator (PRG) and, in particular, by sampling random seeds and feeding them to the PRG to generate the random samples. Instead of the samples, these seeds are then sent to the data owner. This variant approach is advantageous as it reduces communication costs. Still another approach for the generation of the trigger set is to take valid samples that are close to a classification boundary (i.e., are hard to classify), such that every classification model for the same task predicts a different label when running inference and so can be considered as a unique "signature" of the specific model. In addition, and in any of these approaches the model owner can compress the trigger set data, i.e., the samples or the samples' seeds, etc., as the case may be, before sending them to the data owner to further save communication costs.

Regardless of which of the above-described approaches is used to generate the trigger set, and as noted above, preferably one or more additional optimizations are implemented to further improve the verifiability of the HE-based MLaaS service provider, as is now described. The first optimization is the permutation operation (FIG. 8, 807). According to this approach, and for a set of real data samples on which the inferencing is to take place, at least first and second permutations of a set of trigger samples are generated. Every set of samples (both trigger and real samples) are then sent for homomorphic inferencing on the model at least twice, and in a secret permuted way. Further, and to improve performance, a permutation is packaged with the real data samples prior to encryption using a general purpose data structure, called a tile tensor, that allows users to store multi-dimensional arrays (tensors) of arbitrary shapes and sizes. Tile tensors, which are the second optimization (FIG. 8, 809) enable efficient coding of the trigger and real samples in an HE-friendly manner. These optimizations are implemented without a large overhead in terms of latency (i.e., the time to perform computation), throughput (i.e., number of computations performed in a unit of time), communication costs (i.e., bandwidth) and memory requirements.

Figure 9:
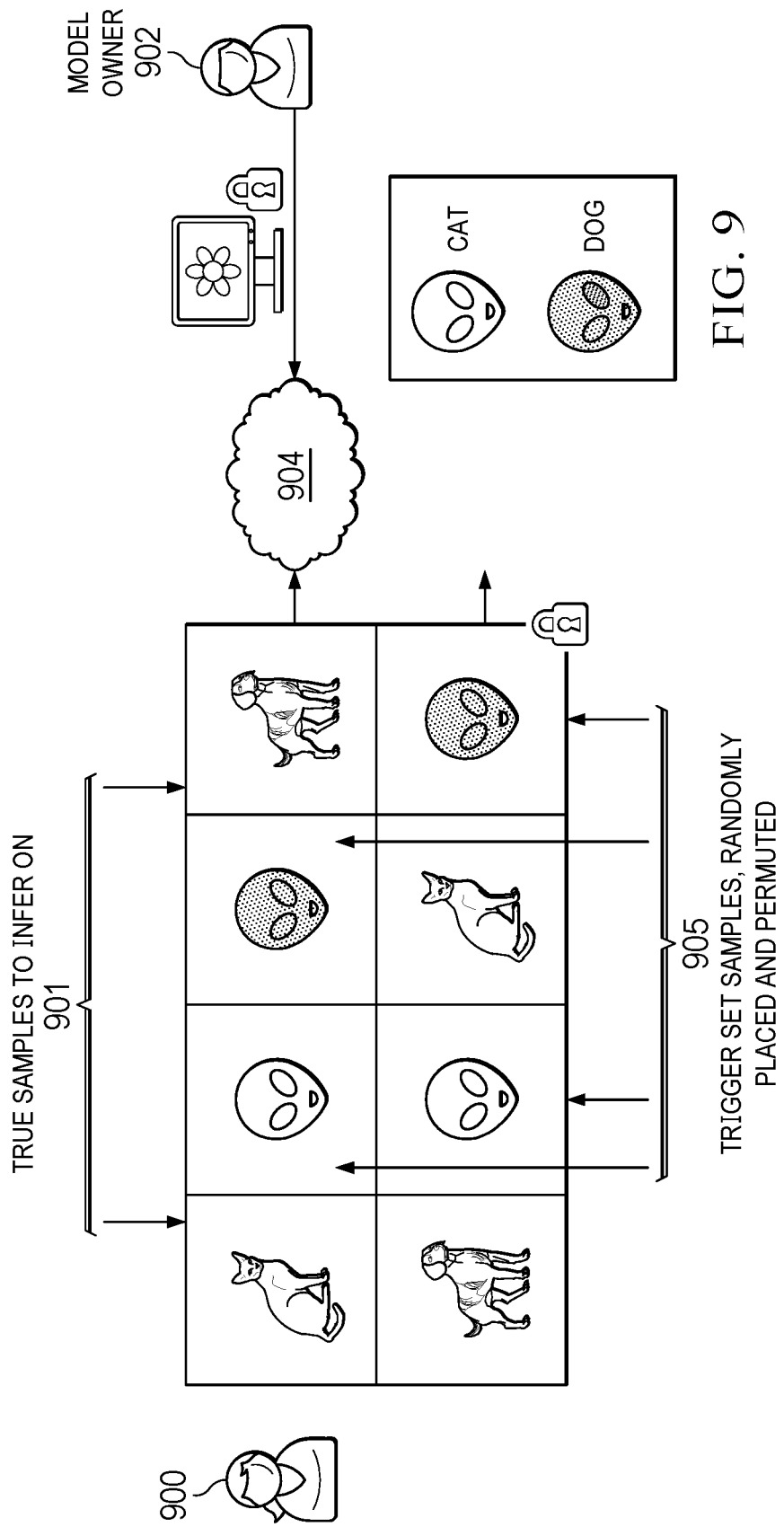
FIG. 9 depicts the permutation operation in additional detail.

The first optimization is the use of trigger set "permutations." A permutation is an arrangement of objects in a definite order. In this optimization, and instead of including just a single trigger set within the submitted data of the data owner, the model owner uses two or more "permutations" of the trigger set. This process is depicted in FIG. 9 by way of example with respect to data owner 900, model owner 902 and service provider 904. In this example, the true data samples (the actual data set for inference) are depicted as the "cat" and "dog" samples 901. In this example, and as described above (as one possible variant), a random seed s for a Pseudo-Random Generator (PRG) is sampled for each seed of a set: $\{s_1, \ldots s_T\}$ to generate the random samples 905 for the seed (and the resulting labels are saved). In an alternative embodiment, the random samples 905 are just fabricated samples that contain random noise. The trigger set samples 905 are then randomly placed and permutated in the manner depicted in FIG. 9. Thus, in a first permutation (and given the four (4) slots as shown), the samples 905 are placed in the second and third slots, while the true data samples 901 are positioned in the first and fourth slots; in a second permutation, the samples 905 occupy the second and fourth slots, while the true samples 901 occupy the first and third slots, and so on for one or more additional permutations. To reduce the probability that the service provider can cheat, a trigger set sample 905 that is used across two or more permutations in this manner are the same, and preferably all of the trigger set samples are reused across both permutations Further, and as depicted in FIG. 9, preferably every set of samples (both real and trigger) are sent at least two (2) times (in this example, one row of encrypted data at a time) and in this secret permutated way. Moreover, and according to this technique, a permutation (the actual ordering of the samples relative to one another) is known only to the verifier (the data owner in FIG. 5, the model owner in FIG. 6, or the data and model owners cooperating as in FIG. 7). In this way, if a malicious service provider attempts to modify only a small subset of the trigger samples, the probability that it will hit the same samples, without knowing their location, is reduced exponentially.

Thus, and according to this first optimization, a set of trigger samples are packed with the data of the data owner (into the ciphertext) that is being submitted for the HE-based inferencing at the MLaaS, wherein the ordering of the trigger set samples in the permutation is secret (and known only to the verifier). Further, at least one other such permutation of the same trigger set samples is packed with the real data samples and the result encrypted and delivered to the MLaaS in a second iteration. In other words, preferably there are at least first and second permutations of the trigger set samples, and the resulting encrypted data for each permutation is sent to the service provider for inferencing separately in at least two separate interactions (communications). In a variant embodiment, and instead of using two separate interactions, the first encrypted data (resulting from the first permutation) and second encrypted data (resulting from the second permutation) are sent together under the condition that each of them is encrypted independently. This alternative works because the encryption itself typically is randomized, and thus the server is not able to learn anything about the secret permutations by seeing both sets at once. When the encrypted data for the first and second permutations is sent separately, typically the inference results are returned for each set separately; when the encrypted data for the first and second permutations is sent together, typically the inference results are returned together.

The second optimization involves the preferred packing of each permuted trigger set samples and the submitted data of the data owner (the true data samples). This optimization is the use of tile tensors, a generalized packing method, which is now described.

By way of background, in HE schemes, the message that can be encrypted is usually a vector of a fixed size that is determined by the scheme's configuration. For example, in the CKKS scheme, an important configuration parameter is a degree n of the polynomial used in the algebraic constructs underlying the scheme. In CKKS, n is a power of 2 and each ciphertext encrypts a vector of n/2 complex numbers. The length of this vector (i.e., the capacity of the ciphertext) is referred to as the number of slots. The computation on encrypted data is performed by primitive operations, notably add and multiply. Both work in Single Instruction Multiple Data (SIMD) fashion on a single ciphertext encrypts a fixed size vector, and the homomorphic operations on the ciphertext are performed slot-wise on the elements of the plaintext vector. Another primitive operator is rotate, which cyclically rotates the encrypted vector by a specified offset. Efficient use of these operators is a major challenge when performing computations under encryption. The challenge is even harder when handling higher dimensional data and perform more complicated computations. Tile tensors were developed to address these challenges.

A tensor is a multi-dimensional array. A tile tensor allows users to store tensors of arbitrary shapes and sizes. The tile tensor automatically packs the tensor data into a collection of vectors of fixed size, as required in HE environments, using a variety of configurable options. Tile tensors also provide a set of operators to manipulate the tensor it its packet form. Similar to a tensor, a tile tensor has a shape, but its shape contains more information. In particular, it describe both the shape of the regular tensor packed inside the tile tensor and the packing details. Tile tensor shapes make it easy to communicate packing details.

In general, tile tensors are tensors made of tiles. A tile is a one dimensional vector of numbers, which can be operated on in an SIMD fashion. For example, the result of adding two tiles is a tile containing the elemental addition of the two vectors they contain. According to this disclosure, the system is augmented to works with tiles of a fixed length and supplies SIMD operations such as addition, multiplication, and rotation. In an example embodiment, the tile tensor is created using a pack operation that receives the tensor to be packed and a desired tile tensor shape, wherein the tile tensor shape is stored as part of the tile tensor. Later, the tile tensor can be unpacked to retrieve the original tensor. In the context of this disclosure, two tensors are packed, one corresponding to the trigger set samples, and the other corresponding to the data samples. The tile tensors can also be used to pack together multiple sets corresponding to different permutations. Further details regarding tile tensors and their use for homomorphic encryption can be found in Aharoni et al., "Tile Tensors: A versatile data structure with descriptive shapes for homomorphic encryption," the disclosure of which is incorporated by reference. By leveraging tile tensors to encode and encrypt the batched data (i.e., the trigger sample and the actual data samples), a nice balance between performance and verifiability is obtained.

In an example implementation, the techniques herein are implemented in IBM® HE4Cloud, an FHE service that enables data scientists to deploy privacy preserving machine learning driven Software-as-a-Service (SaaS) applications in the cloud. The FHE service is powered by HELayers, an FHE Artificial Intelligence (AI) Software Development Kit (SDK). HELayers provides a tile tensors framework that abstracts the packing decision for the user.

The approach herein provides significant advantages. In the usual operating environment, the service provider is untrusted. If the service provider is honest, and because the model inference is a deterministic procedure, the trigger set samples are guaranteed to generate the same labels by the service provider and by the model owner. If at least one of the trigger set samples is reported with a different label than a label that was pre-calculated by the model owner, a determination that the service provider has not acted honestly is then made. An appropriate action can then be taken, e.g., issuing a notification, logging a finding, sandboxing a session, terminating a session, and the like. Preferably, the action is taken in an automated manner.

The example scenario shown in FIG. 9 wherein there are just two (2) permutations and two (2) trigger samples, is not meant to be limiting. While the approach herein will involve at least two (2) permutations of the trigger set, and wherein at the least a second permutation differs from a first permutation in a manner known only to the verifier, one or more additional permutations may also be implemented. Using the above-described approach, wherein trigger set samples are included with the datasets on which the inferencing takes place multiple times and with a secret permutation for each iteration, the data owner and/or model owner have certainty regarding the service provider's integrity. Indeed, the degree to which the data owner and/or the model owner can be assured that the service provider is honest is deterministic. In particular, the following provides a computation of an amount of certainty the data owner and/or the model owner can have that the service provider is honest. Denote by C a maximal number of corrupted predictions the receiver of the inference results can tolerate, denote by T the size of the trigger set, denote by N the number of samples in the data owner's dataset, and denote by L the number of possible labels. Given that a malicious service provider corrupts C random predictions (out of the total N+T predictions it has generated) by choosing for them a label at random, the probability of this to be discovered using the above-described method is:

$$1-n(i=0)^{\wedge}(C-1)=(1-T/(N+T-i)\cdot(L-1)/L)\approx 1-(1-T/(N+T-C)\cdot(L-1)/L)^{\wedge}C$$

For example, when N=1000, T=10, C=100 and L=10, the probability to identify the cloud provider as malicious is 0.61.

The technique herein provides a method, apparatus and computer program product for verifying remote private machine learning (ML) inference performed with homomorphic encryption. The approach increases a success rate of probabilistic verification and, in particular, by repeating a verification process on a permutated set of samples. This significantly increases a probability of catching a cheating service provider, and the solution is still efficient (in terms of latency and bandwidth costs) because it is implemented in non-linear time due to the use of the tile tensors in the preferred implementation.

Generalizing, the method according to this disclosure may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 1) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

As also depicted in FIG. 1, the scheme described herein may be implemented in or in conjunction with various server-side architectures including simple n-tier architectures, web portals, federated systems, and the like. The techniques herein may also be practiced in whole or in part in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the analytics engine functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

In a representative embodiment, the FHE system and the permutation, packing and verification code are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the system described above.

While the above describes a particular order of operations performed by certain embodiments of the disclosed subject matter, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein provide for improvements to another technology or technical field, namely, homomorphic inferencing systems, as well as improvements to the operational capabilities of such systems when used in the manner described.

The nature of the data that is subject to the homomorphic inferencing is dependent on the application and is not intended to be limited. Example data types include financial, medical, genomic, measurement data, testing data, and so forth.

Having described the subject matter, what is claimed is as follows:

1. A method for verifying proof of work of a service provider that performs homomorphic inferencing on a model, comprising:

generating a set of trigger samples;

packing the set of trigger samples together with each of first and second sets of real data samples, wherein the set of trigger samples are packed with the first set of real data samples in first encrypted data according to a first permutation, and wherein the set of trigger samples are packed with the second set of real data samples in second encrypted data according to a second permutation that differs from the first permutation;

forwarding the first and second encrypted data to the service provider for homomorphic encryption-based inferencing on the model;

receiving from the service provider one or more results;

based on the one or more results, determining whether the service provider is compromised; and upon a determination that the service provider is compromised, taking a given mitigation action.

2. The method as described in claim 1 wherein an ordering of the trigger samples in each of the first and second permutations is secret except to a verifier that determines whether the service provider is compromised.

3. The method described in claim 2 wherein determining whether the service provider is compromised includes the verifier validating that at least one label predicated by the model for a sample in the set of trigger samples matches a label returned in the one or more results.

4. The method as described in claim 2 wherein the verifier is one of: the data owner, an owner of the model, and a combination of the data owner and the model owner.

5. The method as described in claim 1 wherein a sample in the set of trigger samples is one of: noise, a seed applied to a random number generator, and a data sample associated with at least one of the first second sets of real data samples and that has a given relationship to a classification boundary.

6. The method as described in claim 1 wherein the first and second permutations are packed with the first and second set of real data samples as a tile tensor.

7. An apparatus, comprising:

at least one processor;

computer memory holding computer program instructions executed by the at least one processor to verify proof of work of a service provider that performs homomorphic inferencing on a model, the computer program instructions comprising program code configured to:

generate a set of trigger samples;

pack the set of trigger samples together with each of first and second sets of real data samples, wherein the set of trigger samples are packed with the first set of real data samples in first encrypted data according to a first permutation, and wherein the set of trigger samples are packed with the second set of real data samples in second encrypted data according to a second permutation that differs from the first permutation;

forward the first and second encrypted data to the service provider for homomorphic encryption-based inferencing on the model;

receive from the service provider one or more results;

based on the one or more results, determine whether the service provider is compromised; and upon a determination that the service provider is compromised, take a given mitigation action.

8. The apparatus as described in claim 7 wherein an ordering of the trigger samples in each of the first and second permutations is secret except to a verifier that determines whether the service provider is compromised.

9. The apparatus as described in claim 8 wherein the program code configured to determine whether the service provider is compromised includes program code to validate that at least one label predicated by the model for a sample in the set of trigger samples matches a label returned in the one or more results.

10. The apparatus as described in claim 8 wherein the processing system is associated with a verifier that is one of: the data owner, an owner of the model, and a combination of the data owner and the model owner.

11. The apparatus as described in claim 7 wherein a sample in the set of trigger samples is one of: noise, a seed applied to a random number generator, and a data sample associated with at least one of the first second sets of real data samples and that has a given relationship to a classification boundary.

12. The apparatus as described in claim 7 wherein the first and second permutations are packed with the first and second set of real data samples as a tile tensor.

13. A computer program product in a non-transitory computer readable medium, the computer program product holding computer program instructions executed by at least one processor in a processing system to verify proof of work of a service provider that performs homomorphic inferencing on a model, the computer program instructions comprising program code configured to:

generate a set of trigger samples;

pack the set of trigger samples together with each of first and second sets of real data samples, wherein the set of trigger samples are packed with the first set of real data samples in first encrypted data according to a first permutation, and wherein the set of trigger samples are packed with the second set of real data samples in second encrypted data according to a second permutation that differs from the first permutation;

forward the first and second encrypted data to the service provider for homomorphic encryption-based inferencing on the model;

receive from the service provider one or more results;

based on the one or more results, determine whether the service provider is compromised; and upon a determination that the service provider is compromised, take a given mitigation action.

14. The computer program product as described in claim 13 wherein an ordering of the trigger samples in each of the first and second permutations is secret except to a verifier that determines whether the service provider is compromised.

15. The computer program product as described in claim 14 wherein the program code configured to determine whether the service provider is compromised includes program code to validate that at least one label predicated by the model for a sample in the set of trigger samples matches a label returned in the one or more results.

16. The computer program product as described in claim 14 wherein the processing system is associated with a verifier that is one of: the data owner, an owner of the model, and a combination of the data owner and the model owner.

17. The computer program product as described in claim 13 wherein a sample in the set of trigger samples is one of: noise, a seed applied to a random number generator, and a data sample associated with at least one of the first second sets of real data samples and that has a given relationship to a classification boundary.

18. The computer program product as described in claim 13 wherein the first and second permutations are packed with the first and second set of real data samples as a tile tensor.

* * * * *